US008555278B2

(12) United States Patent
Janakiraman (10) Patent No.: US 8,555,278 B2
(45) Date of Patent: Oct. 8, 2013

(54) METHOD AND SYSTEM FOR MIGRATING A SELECTED SET OF VIRTUAL MACHINES BETWEEN VOLUMES

(75) Inventor: Viswesvaran Janakiraman, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 184 days.

(21) Appl. No.: 13/099,247

(22) Filed: May 2, 2011

(65) Prior Publication Data

US 2012/0284707 A1 Nov. 8, 2012

(51) Int. Cl.
*G06F 9/455* (2006.01)
(52) U.S. Cl.
USPC .............................................. 718/1
(58) Field of Classification Search
None
See application file for complete search history.

(56) References Cited

U.S. PATENT DOCUMENTS

| 6,618,736 | B1 * | 9/2003 | Menage ................................ 1/1 |
| 8,332,847 | B1 * | 12/2012 | Hyser et al. ...................... 718/1 |
| 2007/0067766 | A1 * | 3/2007 | Tal et al. ....................... 717/168 |
| 2008/0127182 | A1 * | 5/2008 | Newport et al. .................. 718/1 |
| 2011/0119427 | A1 * | 5/2011 | Dow et al. ......................... 711/6 |

* cited by examiner

*Primary Examiner* — Gregory Kessler
(74) *Attorney, Agent, or Firm* — Wilmer Cutler Pickering Hale and Dorr LLP (57) ABSTRACT

A method for migrating a selected set of virtual machines from a first volume to a second volume. The method includes receiving a list of virtual machines which are not migrating from a first volume to a second volume, accessing a host file system usage map of a host machine that indicates active blocks of the host file system, and accessing virtual file system usage maps of a plurality of virtual machines that indicate active blocks. A filter usage map that identifies the active blocks of the virtual machines which are not migrating is generated. The plurality of virtual machines are migrated from the first volume to the second volume, wherein the active blocks of the virtual file systems which are not migrating are skipped in accordance with the filter usage map. Subsequently, the metadata at the second volume is processed to reflect the virtual machines which were not migrated.

20 Claims, 10 Drawing Sheets

METHOD AND SYSTEM FOR MIGRATING A SELECTED SET OF VIRTUAL MACHINES BETWEEN VOLUMES

FIELD OF THE INVENTION

The present invention is generally related to digital computer, more particularly, to a system and method for periodically replicating data in volumes.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication technology is primarily used for disaster recovery and data distribution. Continuous replication technology often includes RAID based replication schemes (e.g., disk mirroring, parity, or the like). Continuous replication maintains copies of the data as the data is being written to by applications. Periodic replication is another technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized. For both continuous replication and periodic replication, in addition to disaster recovery, the replicated data enables a number of other uses, such as, for example, data mining, reporting, testing, and the like. In this manner, the replicated data copy ensures data integrity and availability. Additionally, replication technology is frequently coupled with other high-availability techniques, such as clustering, to provide an extremely robust data storage solution.

Data storage required for applications such as file systems and databases are typically allocated from one or more storage devices that are maintained as a "volume." The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. The content of a volume is accessed using fixed sized data units called blocks.

In very large distributed computer systems the data is distributed in number of data servers. The clients directly write data to the data servers with minimal points of interaction with any metadata server. The data servers typically have multiple LUNs (logical unit numbers) which have their own reserved storage space. Each LUN can have a large number of partitions, with the objects contained in these partitions. The files of distributed computer system file system are composed of the objects from any of the data server LUN partitions. The objects from various data servers are combined to form RAID groups.

In a virtual environment such as Hyper-V, performance of the virtual disk is best when fixed VHD is used as compared to dynamic VHD. Fixed VHD allocates all blocks in the file system when the VHD is created. Therefore, for example, a 24 GB fixed VHD will create a file that is about 24 GB. This is different from dynamic VHD which, for example, only allocates enough storage to store data that is actually written to the VHD. A 24 GB dynamic VHD may only occupy a few MB when it's created. Fixed VHD is good for performance, but it presents a challenge for an optimized replication process, where file system information is used to reduce the amount of data to be copied when a new mirror is added to a volume.

Since fixed VHD allocates all blocks in advance, a conventional implementation of an optimized replication process cannot skip any block used by the VHD even though not all blocks are used by the VHD file. Conventional implementation of "optimized mirror/clone creation" can only skip white spaces not in use outside of the VHD files themselves and not within the file systems they host. Thus a typical volume hosting many such large VHD files cannot reap any performance benefits by simply using file system information on the volume. This factor causes replication processes performed in the conventional optimized manner to be excessively time consuming and overly resource intensive.

SUMMARY OF THE INVENTION

Embodiments of the present invention provide a solution that enables an efficient, highly available, and highly scalable process for the replication of data for a distributed computer system including one or more virtual machines. Embodiments of the present invention implement an optimized scheme that can look into individual VHD files thru the file systems they host to truly eliminate copying white spaces.

A method for migrating a selected set of virtual machines from a first volume to a second volume. The method includes receiving a list of virtual machines which are not migrating from a first volume to a second volume, accessing a host file system usage map of a host machine that indicates active blocks out of a plurality of blocks of the host file system on the first volume, and accessing a plurality of virtual file system usage maps of a plurality of virtual machines that indicate active blocks of the virtual file systems out of a plurality of blocks of the first volume. A filter usage map that identifies the active blocks of the virtual machines which are not migrating is generated based on the virtual file system usage maps and the host file system usage map. The plurality of virtual machines are migrated from the first volume to the second volume, wherein the active blocks of the virtual file systems which are not migrating are skipped in accordance with the filter usage map. Subsequently, the metadata at the second volume is processed to properly reflect the virtual machines which were not migrated. In one embodiment, the virtual machine is mounted by the host machine to access the host file system.

In one embodiment, the files comprising the virtual machines which are identified as not migrating are locked to prevent the fragmentation processing.

In one embodiment, the filter usage map comprises a bitmap.

In one embodiment, the list of virtual machines which are not migrating is received from a system administrator.

In one embodiment, the first volume is at a primary site and the second volume is a secondary site.

In one embodiment, the processing of metadata at the second volume is accomplished via a script mechanism.

In one embodiment, the second volume is size adjusted by a script mechanism to properly reflect the virtual machines which were not migrated.

In one embodiment, the present invention is implemented as a computer-readable storage medium having stored thereon, computer executable instructions that, if executed by a computer system cause the computer system to perform a method for migrating a selected set of virtual machines from a first volume to a second volume. The method includes receiving a list of virtual machines which are not migrating from a first volume to a second volume, accessing a host file system usage map of a host machine that indicates active blocks out of a plurality of blocks of the host file system on the first volume, and accessing a plurality of virtual file system usage maps of a plurality of virtual machines that indicate active blocks of the virtual file systems out of a plurality of blocks of the first volume. A filter usage map that identifies the active blocks of the virtual machines which are not migrating is generated based on the virtual file system usage maps and the host file system usage map. The plurality of virtual machines are migrated from the first volume to the second volume, wherein the active blocks of the virtual file systems which are not migrating are skipped in accordance with the filter usage map. Subsequently, the metadata at the second volume is processed to properly reflect the virtual machines which were not migrated. In one embodiment, the virtual machine is mounted by the host machine to access the host file system.

In one embodiment, the present invention is implemented as a volume replication system, including a computer system having a processor coupled to a computer-readable storage media and executing computer-readable code which causes the computer system to implement a replication manager module. The replication manager module functions by receiving a list of virtual machines which are not migrating from a first volume to a second volume, accessing a host file system usage map of a host machine that indicates active blocks out of a plurality of blocks of the host file system on the first volume, and accessing a plurality of virtual file system usage maps of a plurality of virtual machines that indicate active blocks of the virtual file systems out of a plurality of blocks of the first volume. A filter usage map that identifies the active blocks of the virtual machines which are not migrating is generated based on the virtual file system usage maps and the host file system usage map. The plurality of virtual machines are migrated from the first volume to the second volume, wherein the active blocks of the virtual file systems which are not migrating are skipped in accordance with the filter usage map. Subsequently, the metadata at the second volume is processed to properly reflect the virtual machines which were not migrated. In one embodiment, the virtual machine is mounted by the host machine to access the host file system.

Some portions of the detailed descriptions, which follow, are presented in terms of procedures, steps, logic blocks, processing, and other symbolic representations of operations on data bits within a computer memory. These descriptions are representations are the means used by those skilled in the data processing arts to most effectively convey the substance of their work to others skilled in the art. A procedure, computer executed step, logic block, process, etc., is here, and generally, conceived to be self-consistent sequence of steps or instructions leading to a desired result. The steps are those requiring physical manipulations of physical quantities. Usually, though not necessarily, these quantities take the form of electrical or magnetic signals of a computer-readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer-readable media into other data similarly represented as physical quantities within the computer system memories or registers or other such information storage, transmission or display devices.

Embodiments of the present invention implement an optimized method for new mirror/copy creation of volumes., such as, for example, SFW (Storage Foundation for Windows™) hosting a large collection of pre-allocated Hyper-V virtual machine image files (VHD), such as, for example, Hyper-V, while the virtual machines are in use. The optimized method includes using volume level change tracking and zero write suppression/emulation logic. Additionally, embodiments of the present invention includes functionality for selectively migrating a subset of VHD files from the given volume onto new target volume, rather than copying over the entire volume. This migration can be implemented for various reasons, such as, for example, workload/space usage balancing on a given backend array, enhance performance of an application, and the like.

In so doing, embodiments of the present invention provide a solution that enables an efficient and highly scalable process for the replication of data for a distributed computer system including one or more virtual machines. Embodiments of the present invention can replicate a data volume optimally. The volume may have one or more virtual file systems belonging to one or more virtual machines. Embodiments of the present invention are optimized to function with highly scalable distributed computer systems having hundreds of virtual nodes and physical nodes, or more (e.g., cloud computing system, etc.). In a typical usage scenario, application data resides across a large number of data server nodes. These data server nodes can be physical nodes, virtual nodes, or a combination of the two. Clients interact with the distributed computer system by directly writing data to one or more of the virtual/physical data server nodes. The physical nodes (e.g., data servers) typically have multiple LUNs (logical unit numbers) which each have their own reserved storage space. A typical implementation would have the LUNs configured with multiple partitions.

The files of the distributed computer system are composed of objects (e.g., data objects, etc.) which can be from any of the data server nodes, any of the LUNs and/or any of the partitions. Embodiments of the present invention efficiently handle replication for the virtual nodes of the distributed computer system in a manner that is scalable and provides high availability. Additionally, embodiments of the present invention implement their application processes without taking the virtual nodes off-line.

Figure 1:
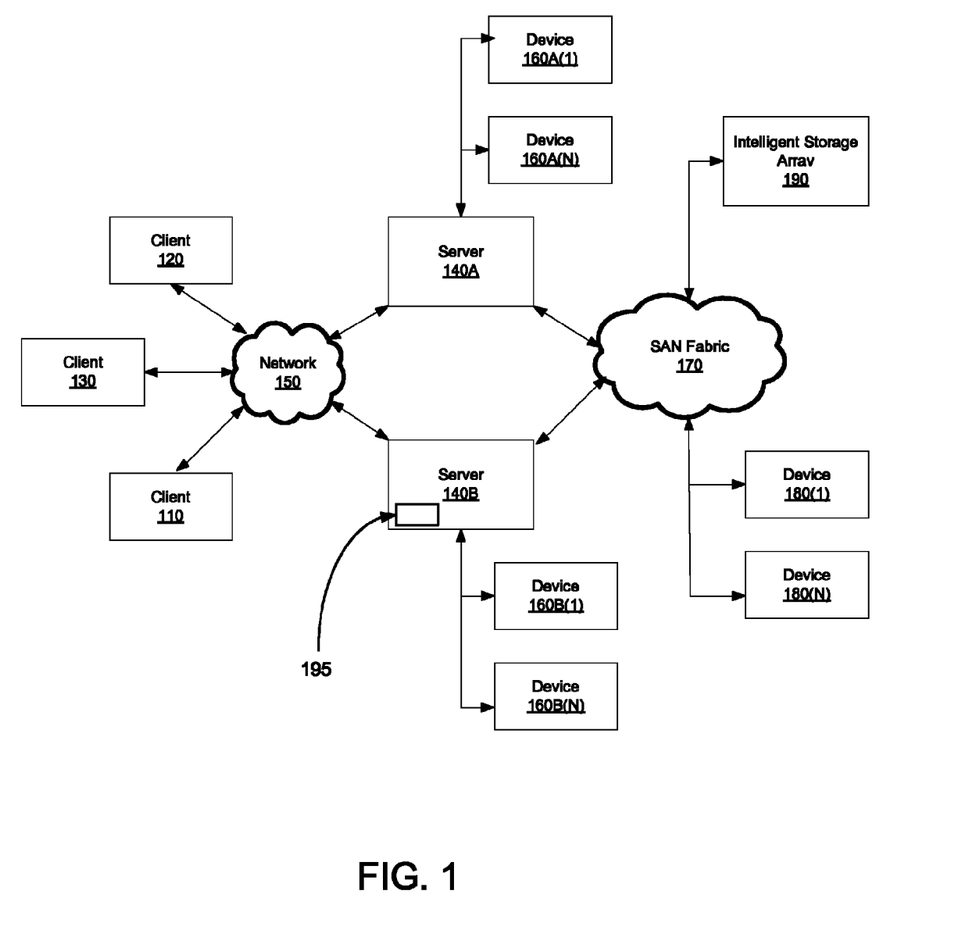
FIG. 1 illustrates a replication operation within a replication system environment according to one embodiment of the present invention.

FIG. 1 is a block diagram depicting a network architecture 100 in which client systems 110, 120 and 130, as well as storage servers 140A and 140B are coupled to a network 150 in accordance with one embodiment of the present invention. The storage servers 140A and 140B can be used to instantiate one or more virtual machines. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a replication manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.). A typical replication process is now described in the discussions of FIG. 2 below.

Figure 2:
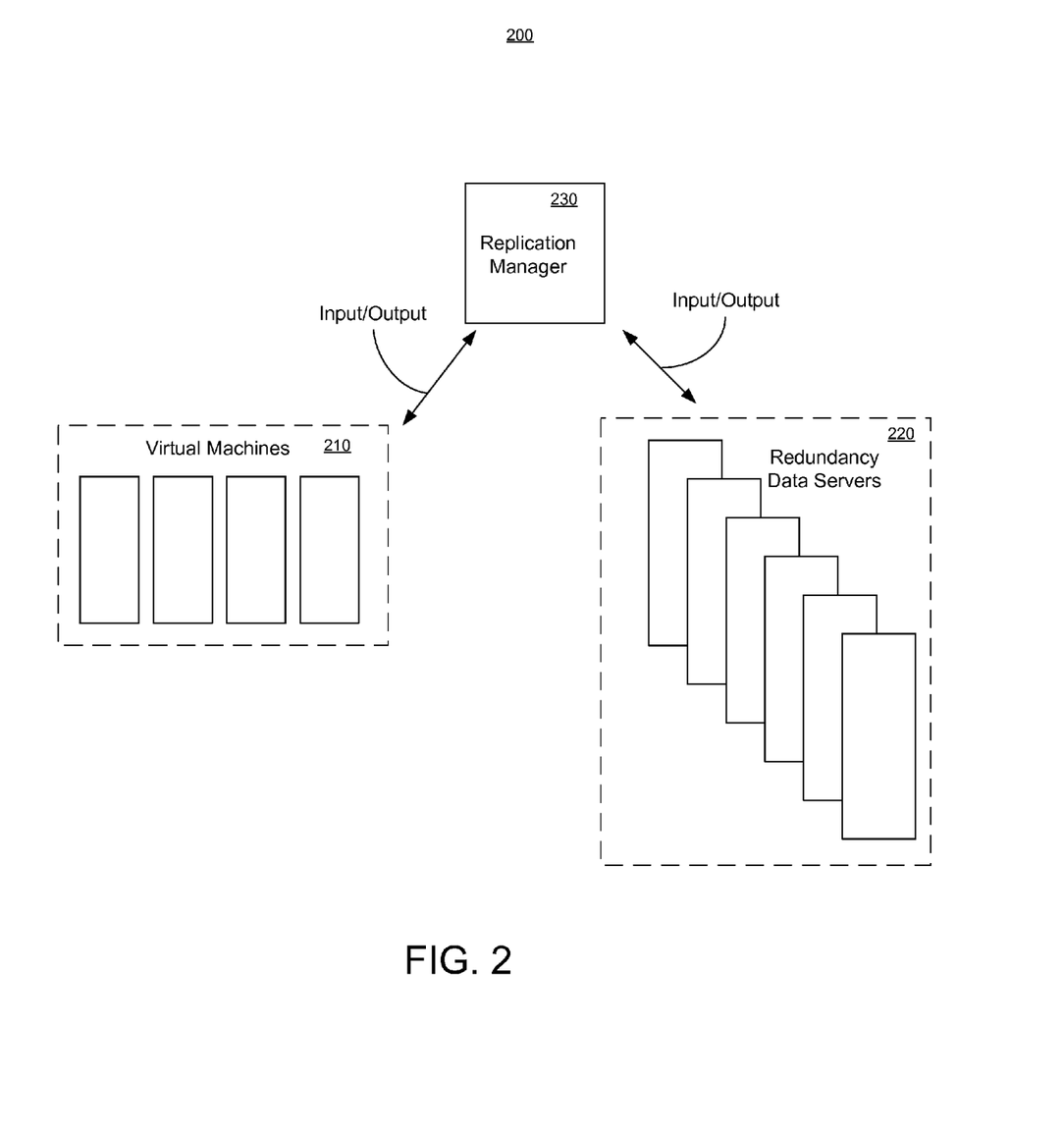
FIG. 2 shows a replication operation as implemented between virtual machines nodes and redundancy data server nodes in accordance with one embodiment of the present invention.

FIG. 2 shows a data flow diagram 200 depicting the operation of an exemplary replication process in accordance with one embodiment of the present invention. As depicted in FIG. 2, a group of virtual machine data servers 210 host data that is accessed by a large number of client computer systems (e.g., clients 110-130). As I/O data comes in from the client computer systems (e.g., I/O writes), the I/O data is forwarded to a replication manager 230, which processes the I/O data and transfers it to a plurality of redundant data servers 220.

The FIG. 2 embodiment illustrates a scalable distributed computer system environment. In one embodiment, the distributed computer system environment implements any of a number of different RAID redundancy schemes by forwarding data from the replication manager 230 to the plurality of redundancy data servers 220.

Through the normal course of operation, the client's I/O data, specifically their write data (e.g., the similar holds true for the metadata written by one or more metadata servers) is generated, is received and stored on the virtual machines 210. The virtual machines 210 then forward these data objects to the replication manager 230. The replication manager 230 then forwards these data objects to the destination redundancy data servers according to the replication policy, such as, for example, the RAID policy. For example if the RAID policy for the file is RAID-1 then it just has to copy the data, whereas if the RAID policy is RAID-5 then it has to distribute the data, compute the parity, or even at times read the old data and merge the data before computing parity.

Figure 3:
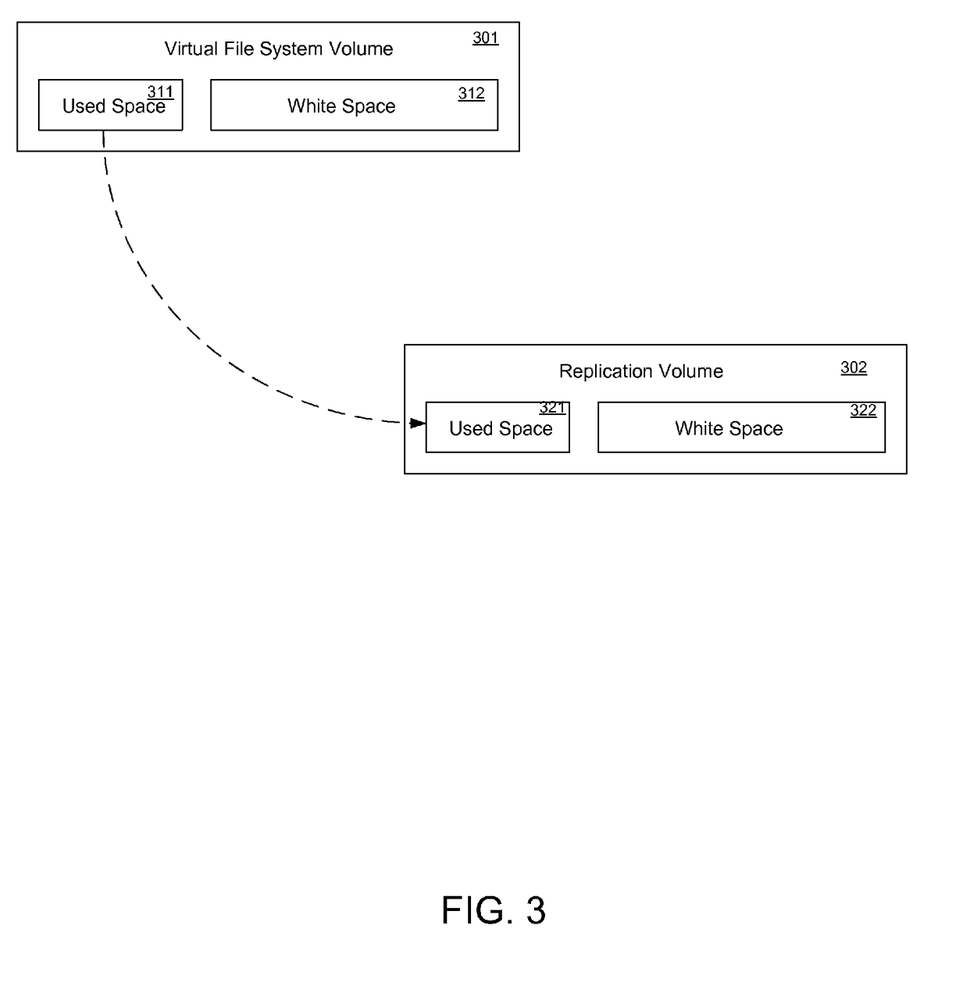
FIG. 3 shows an exemplary virtual file system volume and replication volume 302 in accordance with one embodiment of the present invention.

FIG. 3 shows an exemplary virtual file system volume and replication volume 302 in accordance with one embodiment of the present invention. As depicted in FIG. 3, the file system volume comprises both a certain amount of used space 311 and a remaining amount of unused space, which is depicted as whitespace 312. Thus, for example, in a virtual environment such as Hyper-V, where fixed VHD is used, with for example, a 24 GB fixed capacity, as compared to dynamic VHD, a file system volume may only use a sub portion (e.g., used space 311) of the total number of blocks comprising the 24 GB fixed VHD.

Embodiments of the present invention advantageously enable the use of fixed VHD for high I/O performance, while implementing an optimized replication process, where file system information is used to reduce the amount of data to be copied when a new mirror is added to a volume. Embodiments of the present invention implement the optimized replication process without taking the virtual file system volume off-line. This aspect greatly improves the availability of the application/data supported by the virtual file system volume. Embodiments of the present invention minimize the I/O traffic during a replication process by transferring only the used space 311 to create the replication volume 302. When the replication is complete, the replication volume 302 will include used space 321 and whitespace 322 and will be mirror of the virtual file system volume 301.

Figure 4:
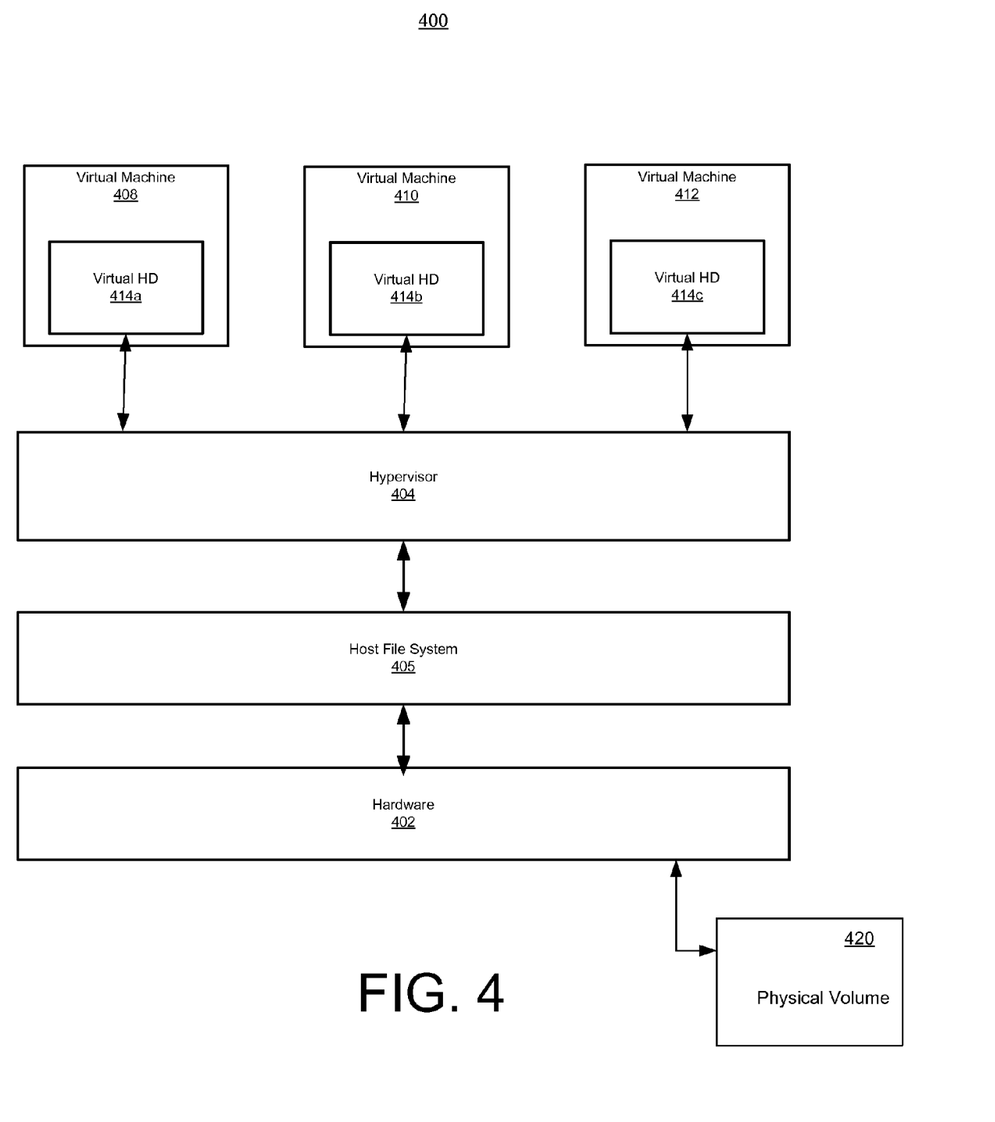
FIG. 4 shows a block diagram of an exemplary virtual environment, in accordance with one embodiment of the present invention.

FIG. 4 shows a block diagram of an exemplary virtual environment, in accordance with one embodiment of the present invention. Exemplary virtual environment 400 includes a host file system 405, hypervisor 404, and virtual machines 408-412. Components of exemplary virtual environment 400 typically execute on or otherwise be part of a distributed computing system (e.g., servers 140a and 140b of FIG. 1).

Hypervisor 404 interfaces with hardware 402 (e.g., of servers 140a-b) and provides resources and services to virtual machines 408-412. In one embodiment, hypervisor 404 is part of a trusted computing base (TCB). Hypervisor 404 provides abstractions including emulated devices of resources in hardware 402 to virtual machines 408-412. In this manner, the virtual hard drives 414a-c are emulated via the hypervisor 404 and the host file system 405 by using a physical volume 420. The physical volume 420 can be, for example, one or more LUNs on server 140A or 140B, or one of storage devices 160A(1)-(N), 160B(1)-(N), 180(1)-(N) or storage array 190.

Figure 5:
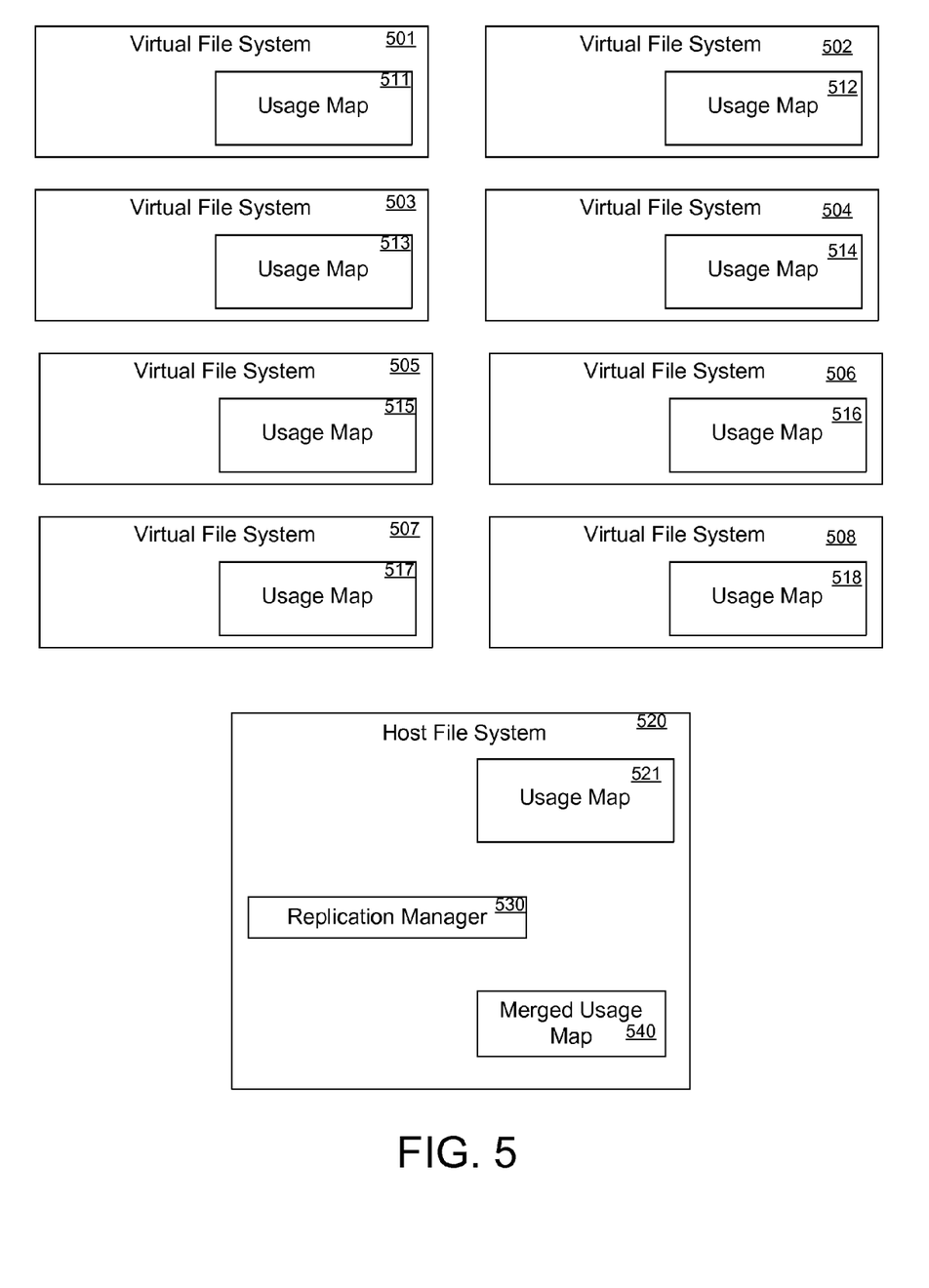
FIG. 5 shows an exemplary virtual file system including respective usage maps in accordance with one embodiment of the present invention.

FIG. 5 shows exemplary virtual file systems 501-508 including respective usage maps 511-518, in accordance with one embodiment of the present invention. FIG. 5 also shows a host file system 520 with its respective usage map 521.

The FIG. 5 embodiment shows the respective usage maps 511-518 of the virtual file systems 501-508 of multiple different virtual machines. In one embodiment, the host file system usage map implements block level change tracking, zero region write suppression/emulation and zero filling of deleted file space functionalities. These functionalities allow fast mirror creations by only copying actual blocks in use.

In one embodiment, the respective usage maps 511-518 of the virtual file systems 501-508 comprise a volume level change tracking mechanism to detect changes to the volume in a persistent way. As described above, in one embodiment, the changes are recorded into bitmap. The replication manager then uses zero write detection/suppression logic, which functions by trapping attempts to write zero data into volume and suppressing such writes. The bitmap for the corresponding region is then reset. Similarly, any attempt to read a region marked as not in use will emulate a zero region read. The replication manager can then reclaim deleted/moved file space in the guests to keep the active region bits in the bitmap as small as possible.

In one embodiment, with the mechanisms described above, when it is time to clone/copy the volume, the replication manager creates a target volume and starts copying over data belonging to active bits in the bitmap in addition to any ongoing writes to achieve a fast copy of the volume with minimal data movement.

It should be noted that although eight virtual file systems 501-508 are shown, the host file system may be supporting many more (e.g., 20 to 40, or even more). Embodiments of the present invention can determine which of the number of virtual machines have been active recently by checking its own respective host file system usage map 521. The host file system usage map 521 will identify which virtual file system has been active (e.g., which blocks of the physical volume have been updated). In one embodiment, the usage map comprises a bitmap where a bit being set indicates the corresponding block is in use.

It should also be noted that in one embodiment, the replication manager can generate a merged usage map 540. The replication manager 530 can access the host file system usage map 521 of the host machine and discover those active blocks out of a plurality of blocks of the host file system. The replication manager 530 can also access the virtual file system usage maps 511-518 of the virtual machines. The virtual file system usage maps 511-518 indicate the active blocks out of the total plurality of blocks of the virtual file systems. Using this information, a merged usage map 540 can be generated by the replication manager. The merged usage map 540 identifies active blocks of the host file system (e.g., on the physical volume) that are associated with the virtual file systems.

In one embodiment, a given virtual machine needs to be mounted by the host machine in order for replication manager to access the virtual file system usage map. In such an embodiment, the virtual file system 511 would need to be mounted by the hypervisor and the host file system 520 in order to allow the replication manager 530 to access the usage map 511 of the virtual file system 501.

Alternatively, in one embodiment, the virtual machine does not need to be mounted by the host machine to access the host file system. In such an embodiment, the replication manager 530 can more directly access the usage map 511 of the virtual file system 501 (e.g., via an API call, etc.).

In one embodiment, the replication manager uses a space optimized snapshot to maintain the accessibility of the virtual file system on the primary volume. In such an embodiment, this space optimized snapshot volume comprises a point-in-time image that the replication is based on. The replication manager uses the space optimized snapshot to access a virtual file system usage map of a virtual machine that indicates active blocks out of a plurality of blocks of the virtual file system. As described above, access to the virtual file system usage map can be implemented either by mounting the virtual disk files on the snapshot through a separate virtual machine or by using off-line tools or APIs which understand the virtual file format (e.g., VHD/VMDK etc formats, or the like).

Figure 6:
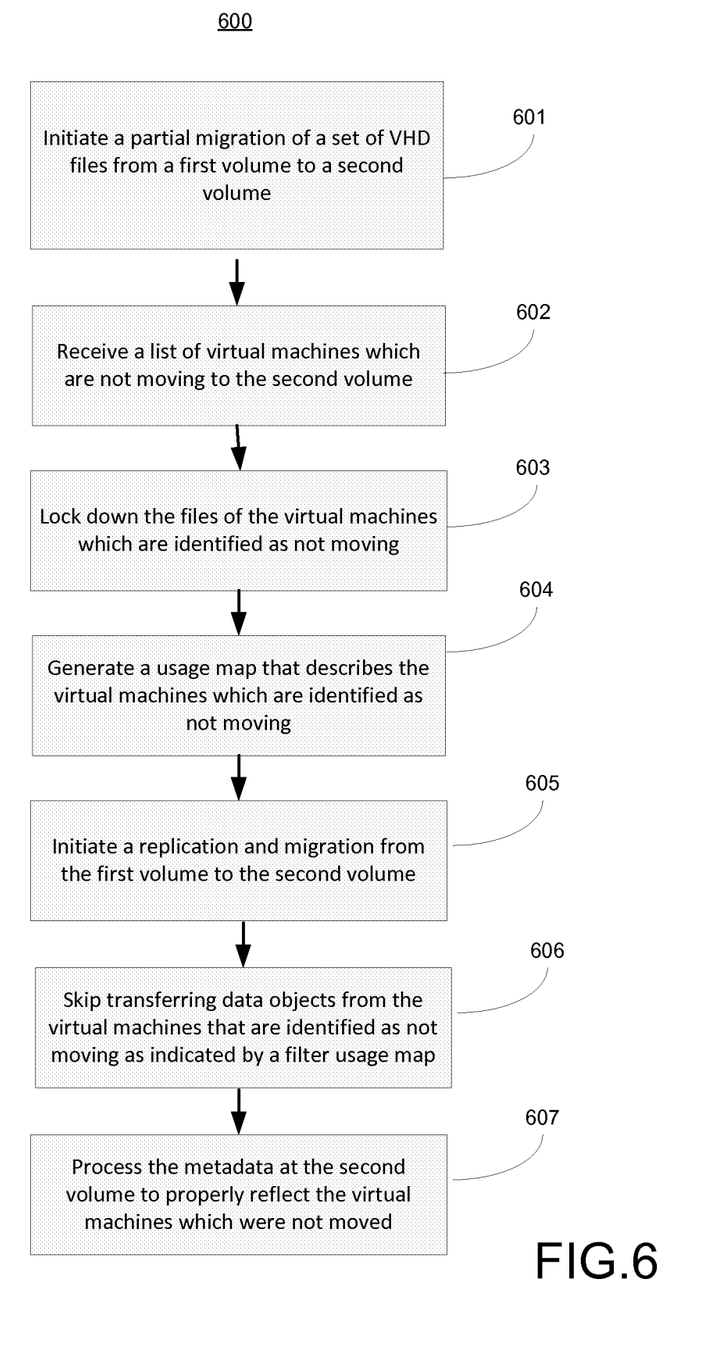
FIG. 6 shows a flowchart of the steps of a replication process in accordance with one embodiment of the present invention.

FIG. 6 shows a flowchart of the steps of a replication process 600 in accordance with one embodiment of the present invention. As depicted in FIG. 6, process 600 shows exemplary operating steps involved in implementing a partial migration of a set of pre-allocated virtual file systems from one volume to another volume. In one embodiment, the replication process is performed on a data volume that includes multiple virtual file systems, where it is desired that only a subset of the virtual file systems on the volume are replicated and migrated.

Process 600 begins in step 601, where a partial migration is initiated.

In step 602, a list of VHD files associated with virtual machines which are not moving is received. This list can also include other large files associated with a virtual machine which will not change in size during the operation. For example, in a case where virtual file systems 507 and 508 are not moving, the list would identify their VHD files. This step leads to the generation of a copy bitmap that indicates the minimal set of blocks that need to be copied over to the second volume (e.g., target volume).

In step 603, the files of the virtual machines that are identified as not moving are locked down. In one embodiment, this includes enforcing a no defragmentation policy on these files. In one embodiment, this functionality is provided by a filter driver.

In step 604, usage maps are obtained for the files of the virtual machines that are identified as not moving. In one embodiment, the usage map comprises a bitmap, as described above. The bitmap that identifies the virtual machines that are not moving to the second volume comprises a filter usage map, or filter bitmap. The filter usage map can be aligned to an appropriate region boundary if the region and the file system cluster sizes do not match. Thus only regions completely within the listed file will be set in the bitmap.

In step 605, a replication and migration operation is initiated from the first volume to the second volume. As described above, when it is time to clone/copy the first volume, the replication manager creates a second target volume and starts copying over data belonging to active bits in the bitmap in addition to any ongoing writes to achieve a fast copy of the volume with minimal data movement.

In step 606, a replication and migration operation is started between the first volume and the second volume.

In step 607, the filter usage map is used to identify data objects from the virtual machines that are defined as not moving. These data objects are skipped during the replication and migration operation. In one embodiment, any new writes or writes generated by the migration operation will consult the filter usage map, and if the region is in the filter usage map, it will not be written to or copied over into the second volume. Thus, at the end of the copy operation, we will have a new target volume with file system metadata similar to the original volume but with all the data belonging to the skipped VHD files not written, for example, the VHD files for the virtual file systems 507-508, in a case where virtual file systems 507 and 508 are not moving. Thus the operation should complete faster than the full volume replication or migration.

Subsequently, in step 608, the metadata at the 2nd volume is processed to properly reflect those virtual machines which were not moved. The new volume will be cleaned up of dangling metadata of files belonging to the virtual machines which did not get moved over. In one embodiment, this can be implemented by using a volume level scripting scheme. Additionally, any needed resizing of the new volume with selected VM images can be accomplished with a similar volume scripting mechanism. Thus, on the next mount of the volume, the volume will contain the VM files which were selectively moved and will be of the requested size specified by, for example, a system administrator.

It should be noted that the above described process 600 could be orchestrated within a scheme such as storage VMotion™, in which case the virtual machines could be moved from one active volume to another active volume in co-operation with the Hypervisor. Such selective virtual machine migration can also be carried out on virtual machines which are offline directly by a SFW™ storage layer and appropriate Hypervisor APIs calls could be made later to indicate their new location to the Hypervisor.

Figure 7:
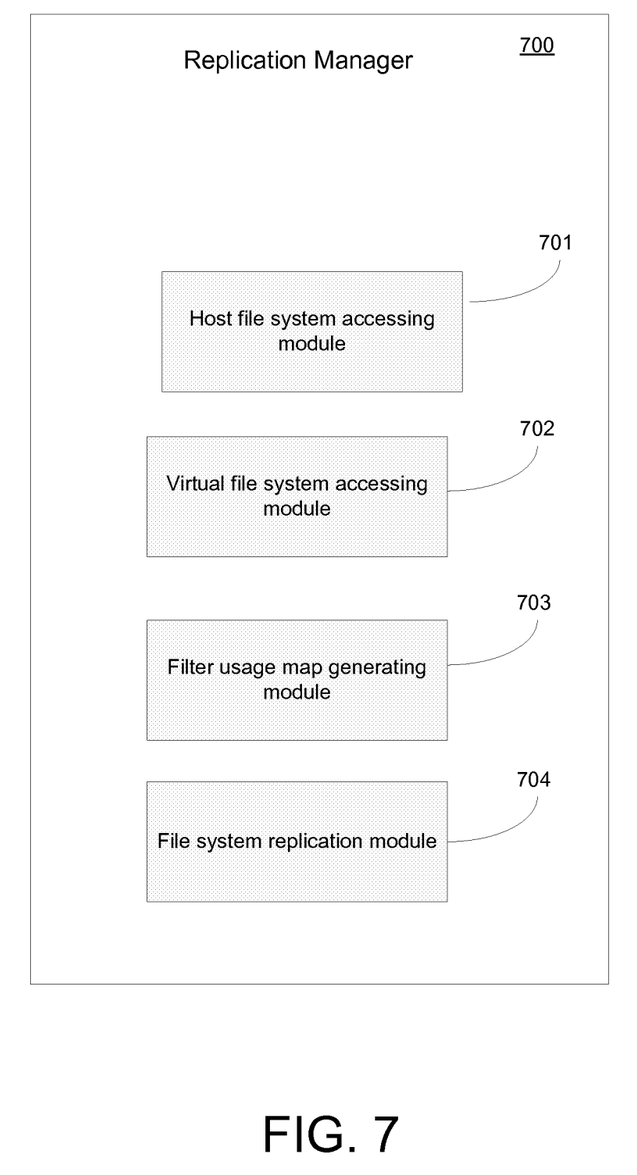
FIG. 7 shows a diagram of a replication manager that implements certain aspects of the replication functionality in accordance with one embodiment of the present invention.

FIG. 7 shows a diagram of a replication manager 700 that implements certain aspects of the replication functionality in accordance with one embodiment of the present invention. The replication manager 700 is a software component or module that when instantiated, implements the functionality of the replication processes of embodiments of the present invention. The replication manager 700 includes a host file system accessing module 701 that functions by accessing the host file system to read the usage maps the host file system. A virtual file system accessing module 702 is included and functions by accessing the virtual file system of a virtual machine and reading the usage map of the virtual file system. A filter usage map generating module is included and is used for merging the information from the host file system usage map with the information from the virtual file system usage map along with a list of the virtual machines which are not moving. A file system replication module is included for replicating data blocks comprising the virtual file system in accordance with the filter usage map.

Figure 8:
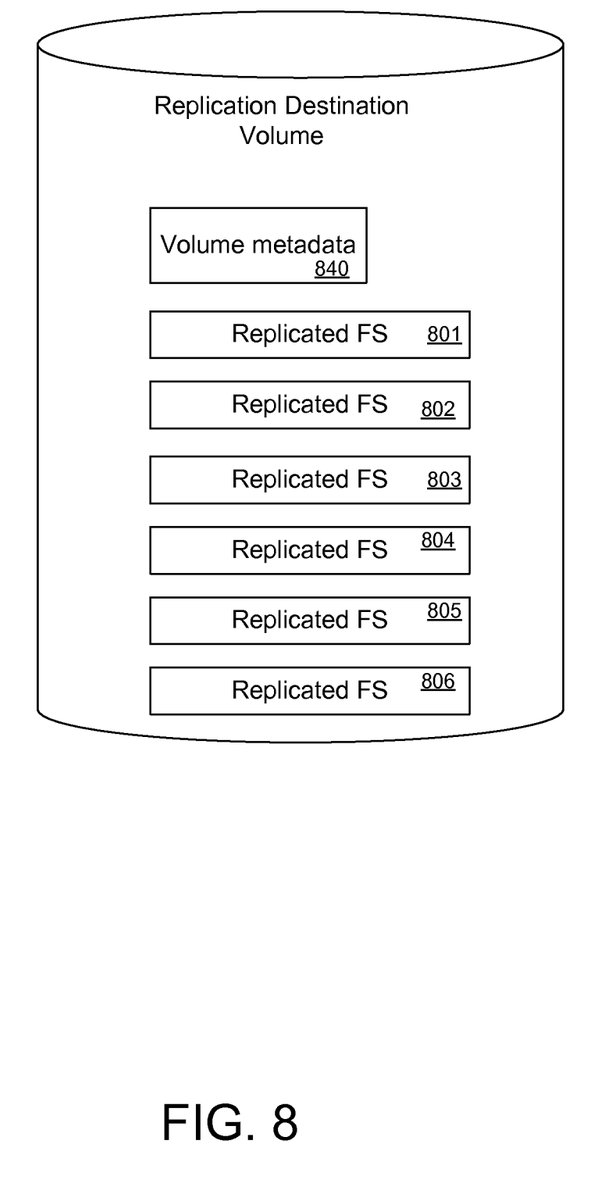
FIG. 8 shows a diagram of a replication destination volume as instantiated on a physical device in accordance with one embodiment of the present invention.

FIG. 8 shows a diagram of a replication destination volume as instantiated on a physical device in accordance with one embodiment of the present invention. As described above, the replication destination volume can be implemented as, for example, one or more LUNs on server 140A or 140B, or one of storage devices 160A(1)-(N), 160B(1)-(N), 170(1)-(N) or storage array 190. The active blocks of the host file system (e.g., on the physical volume) that are associated with the virtual file systems are transferred to the replication destination and are used to create the replicated file systems 801-806. The replicated file systems 801-806 are mirrors of the virtual file systems 501-506, minus the data objects of the virtual machines which do not get moved (e.g., file systems 507-508). The volume metadata 840 is the metadata for the volume which is later harmonized by a metadata processing operation to properly reflect the virtual machines that do not get moved.

Figure 9:
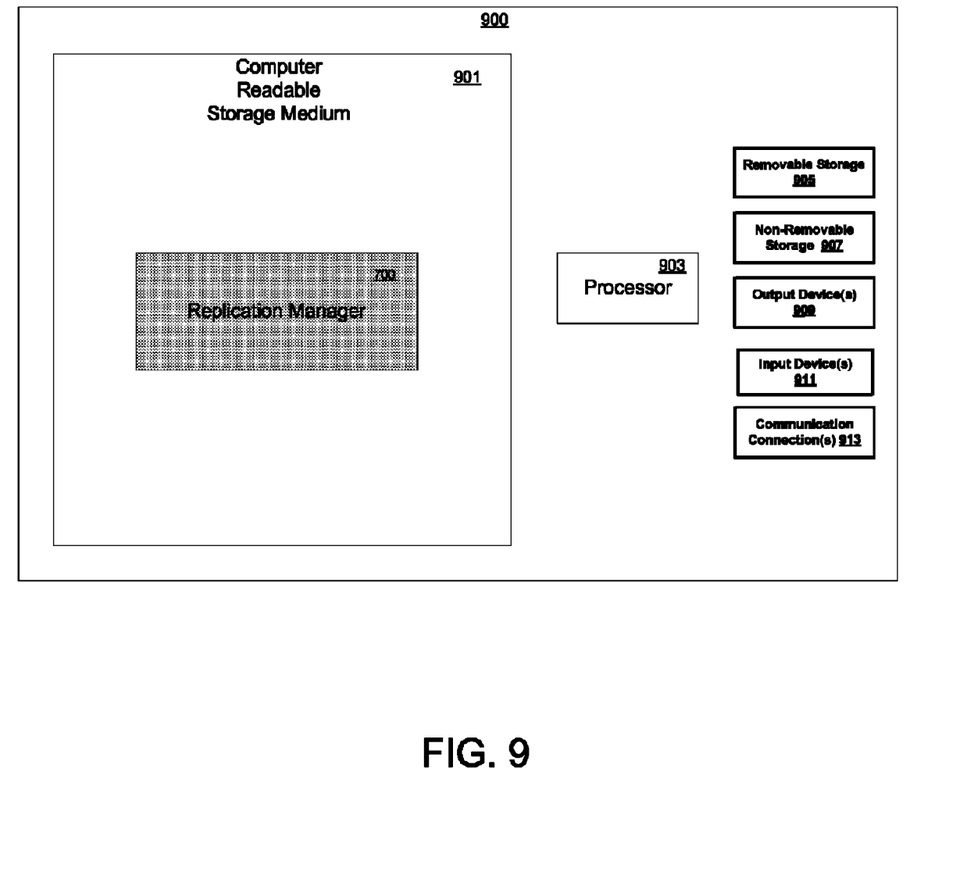
FIG. 9 shows an exemplary computer system according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the replication manager 700 is instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer-readable media (e.g., computer-readable storage medium 901). Computer-readable media can be a number of different types of available media that can be accessed by computer system 900 and can include, but is not limited to, computer storage media.

In its most basic configuration, computer system 900 typically includes processing unit 903 and a computer-readable storage medium 901. Depending on the exact configuration and type of computer system 900 that is used, memory 901 can be volatile (e.g., such as DRAM, etc.), non-volatile (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 911 and/or output devices 909 (e.g., such as a display). Computer system 900 can further include communication connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

Figure 10:
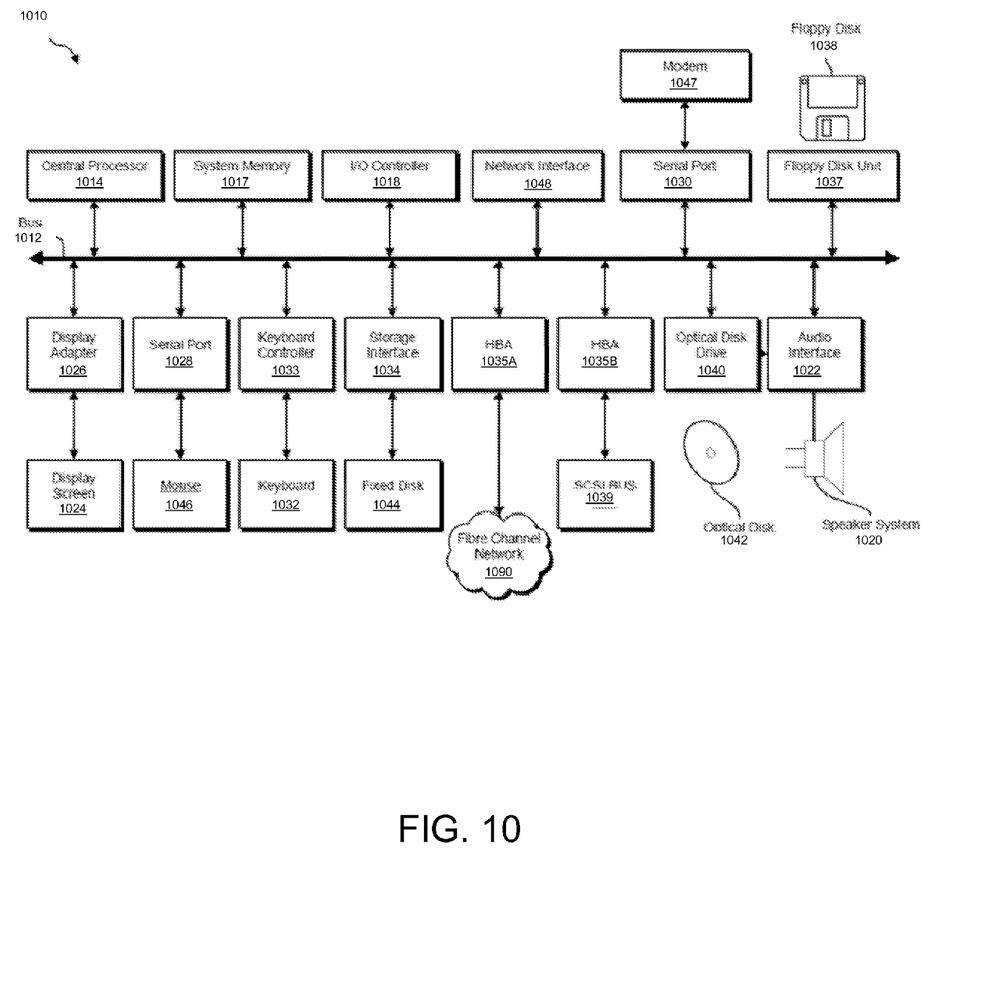
FIG. 10 depicts a block diagram of a second computer system suitable for implementing certain functionality in accordance with one embodiment of the present invention.

FIG. 10 depicts a block diagram of a second computer system 1010 suitable for implementing certain functionality in accordance with one embodiment of the present invention. Computer system 1010 includes a bus 1012 which interconnects major subsystems of computer system 1010, such as a central processor 1014, a system memory 1017 (typically RAM, but which may also include ROM, flash RAM, or the like), an input/output controller 1017, an external audio device, such as a speaker system 1020 via an audio output interface 1022, an external device, such as a display screen 1024 via display adapter 1026, serial ports 1027 and 1030, a keyboard 1032 (interfaced with a keyboard controller 1033), a storage interface 1034, a floppy disk drive 1037 operative to receive a floppy disk 1037, a host bus adapter (HBA) interface card 1035A operative to connect with a Fiber Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1027), a modem 1047 (coupled to bus 1012 via serial port 1030), and a network interface 1047 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. In the FIG. 10 embodiment, the system memory 1017 instantiates a replication manager module 1050 which implements the continuous replication functionality described above. The ROM or flash memory can contain, among other code, the Basic Input-Output system (BIOS) which controls basic hardware operation such as the interaction with peripheral components. Applications resident with computer system 1010 are generally stored on and accessed via a computer-readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1047.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1047 may provide a direct connection to a remote server via a direct network link to the Internet via a POP (point of presence). Network interface 1047 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable storage media such as one or more of system memory 1017, fixed disk 1044, optical disk 1042, or floppy disk 1037. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for migrating a selected set of virtual machines from a first volume to a second volume, comprising:
   receiving a list of virtual machines which are not migrating from a first volume to a second volume;
   accessing a host file system usage map of a host machine that indicates active blocks out of a plurality of blocks of the host file system on the first volume;
   accessing a plurality of virtual file system usage maps of a plurality of virtual machines that indicate active blocks of the virtual file systems out of a plurality of blocks of the first volume;
   generating a filter usage map that identifies the active blocks of the virtual machines which are not migrating, and based on the virtual file system usage maps and the host file system usage map;
   migrating the plurality of virtual machines from the first volume to the second volume, wherein the active blocks of the virtual file systems which are not migrating are skipped in accordance with the filter usage map; and
   processing metadata at the second volume to properly reflect the virtual machines which were not migrated.

2. The method of claim 1, wherein files comprising the virtual machines which are identified as not migrating are locked to prevent fragmentation processing.

3. The method of claim 1, wherein the filter usage map comprises a bitmap.

4. The method of claim 1, wherein the list of virtual machines which are not migrating is received from a system administrator.

5. The method of claim 1, wherein the first volume is at a primary site and the second volume is a secondary site.

6. The method of claim 1, wherein the processing of metadata at the second volume is accomplished via a script mechanism.

7. The method of claim 1, wherein the second volume is size adjusted by a script mechanism to properly reflect the virtual machines which were not migrated.

8. A non-transitory computer-readable storage medium having stored thereon, computer executable instructions that, if executed by a computer system cause the computer system to perform a method comprising:
   receiving a list of virtual machines which are not migrating from a first volume to a second volume;
   accessing a host file system usage map of a host machine that indicates active blocks out of a plurality of blocks of the host file system on the first volume;
   accessing a plurality of virtual file system usage maps of a plurality of virtual machines that indicate active blocks of the virtual file systems out of a plurality of blocks of the first volume;
   generating a filter usage map that identifies the active blocks of the virtual machines which are not migrating, and based on the virtual file system usage maps and the host file system usage map;
   migrating the plurality of virtual machines from the first volume to the second volume, wherein the active blocks of the virtual file systems which are not migrating are skipped in accordance with the filter usage map; and
   processing metadata at the second volume to properly reflect the virtual machines which were not migrated.

9. The non-transitory computer-readable storage medium of claim 8, wherein files comprising the virtual machines which are identified as not migrating are locked to prevent fragmentation processing.

10. The non-transitory computer-readable storage medium of claim 8, wherein the filter usage map comprises a bitmap.

11. The non-transitory computer-readable storage medium of claim 8, wherein the list of virtual machines which are not migrating is received from a system administrator.

12. The non-transitory computer-readable storage medium of claim 8, wherein the first volume is at a primary site and the second volume is at a secondary site.

13. The non-transitory computer-readable storage medium of claim 8, wherein the processing of metadata at the second volume is accomplished via a script mechanism.

14. The non-transitory computer-readable storage medium of claim 8, wherein the second volume is size adjusted by a script mechanism to properly reflect the virtual machines which were not migrated.

15. A volume replication system, comprising:
   a computer system having a processor coupled to a computer-readable storage media and executing computer readable code which causes the computer system to implement a replication manager module, wherein the replication manager module operates to:
      receive a list of virtual machines which are not migrating from a first volume to a second volume; access a host file system usage map of a host machine that indicates active blocks out of a plurality of blocks of the host file system on the first volume;
      access a plurality of virtual file system usage maps of a plurality of virtual machines that indicate active blocks of the virtual file systems out of a plurality of blocks of the first volume;
      generate a filter usage map that identifies the active blocks of the virtual machines which are not migrating, and based on the virtual file system usage maps and the host file system usage map;
      migrate the plurality of virtual machines from the first volume to the second volume, wherein the active blocks of the virtual file systems which are not migrating are skipped in accordance with the filter usage map; and
      process metadata at the second volume to properly reflect the virtual machines which were not migrated.

16. The system of claim 15, wherein files comprising the virtual machines which are identified as not migrating are locked to prevent fragmentation processing.

17. The system of claim 15, wherein the filter usage map comprises a bitmap.

18. The system of claim 15, wherein the list of virtual machines which are not migrating is received from a system administrator.

19. The system of claim 15, wherein the first volume is at a primary site and the second volume is at a secondary site.

20. The system of claim 15, wherein the processing of metadata at the second volume is accomplished via a script mechanism, and wherein the second volume is size adjusted by the script mechanism to properly reflect the virtual machines which were not migrated.

* * * * *